Figure 1:
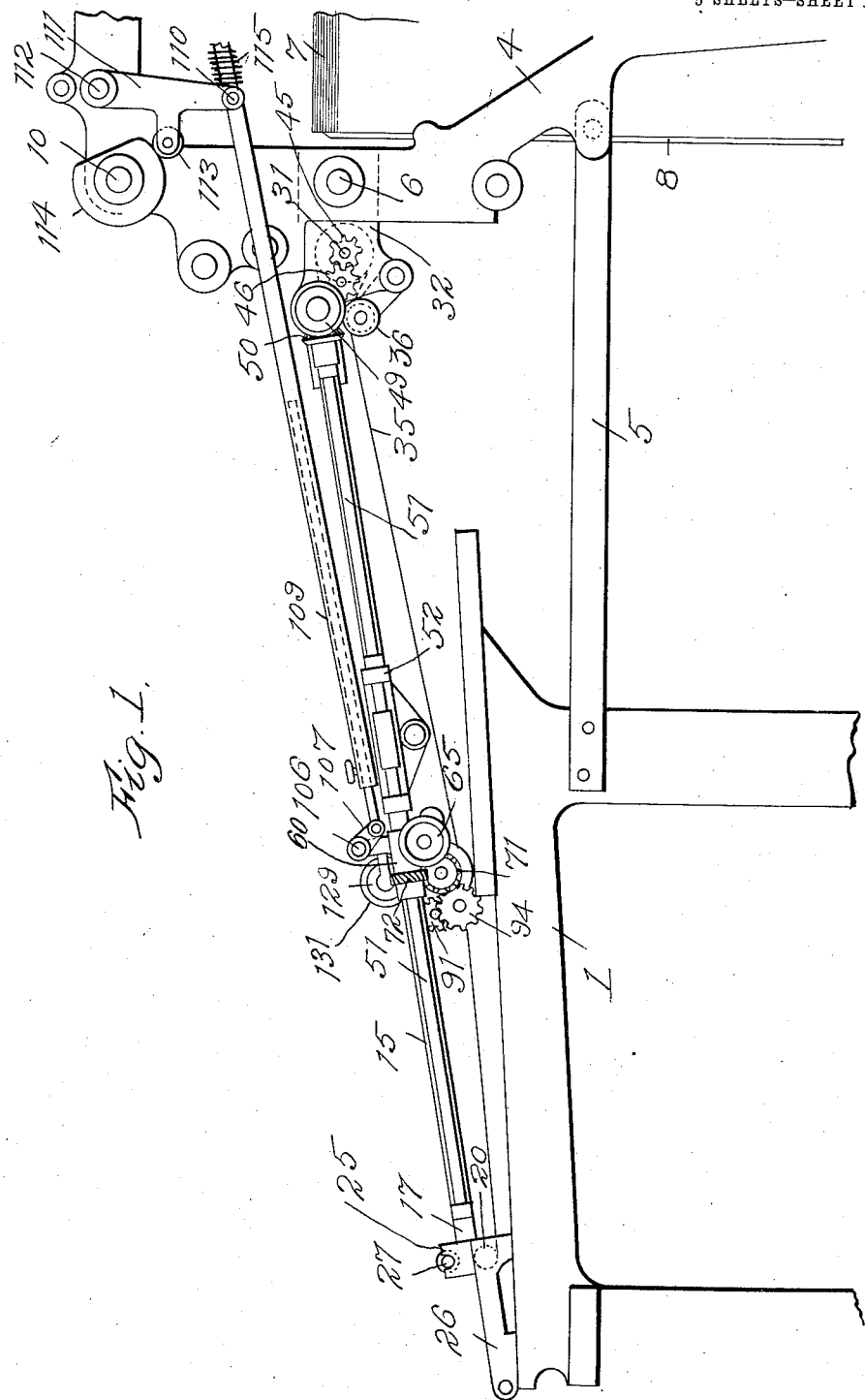

T. C. DEXTER.
SLOW-DOWN MECHANISM FOR SHEET CONVEYING MACHINES.
APPLICATION FILED AUG. 25, 1909.

985,014.

Patented Feb. 21, 1911.
5 SHEETS—SHEET 1.

Witnesses:
Wm. A. Cattland
Marion Gifford

Inventor
Talbot C. Dexter,
By his Attorneys
Knight Bros

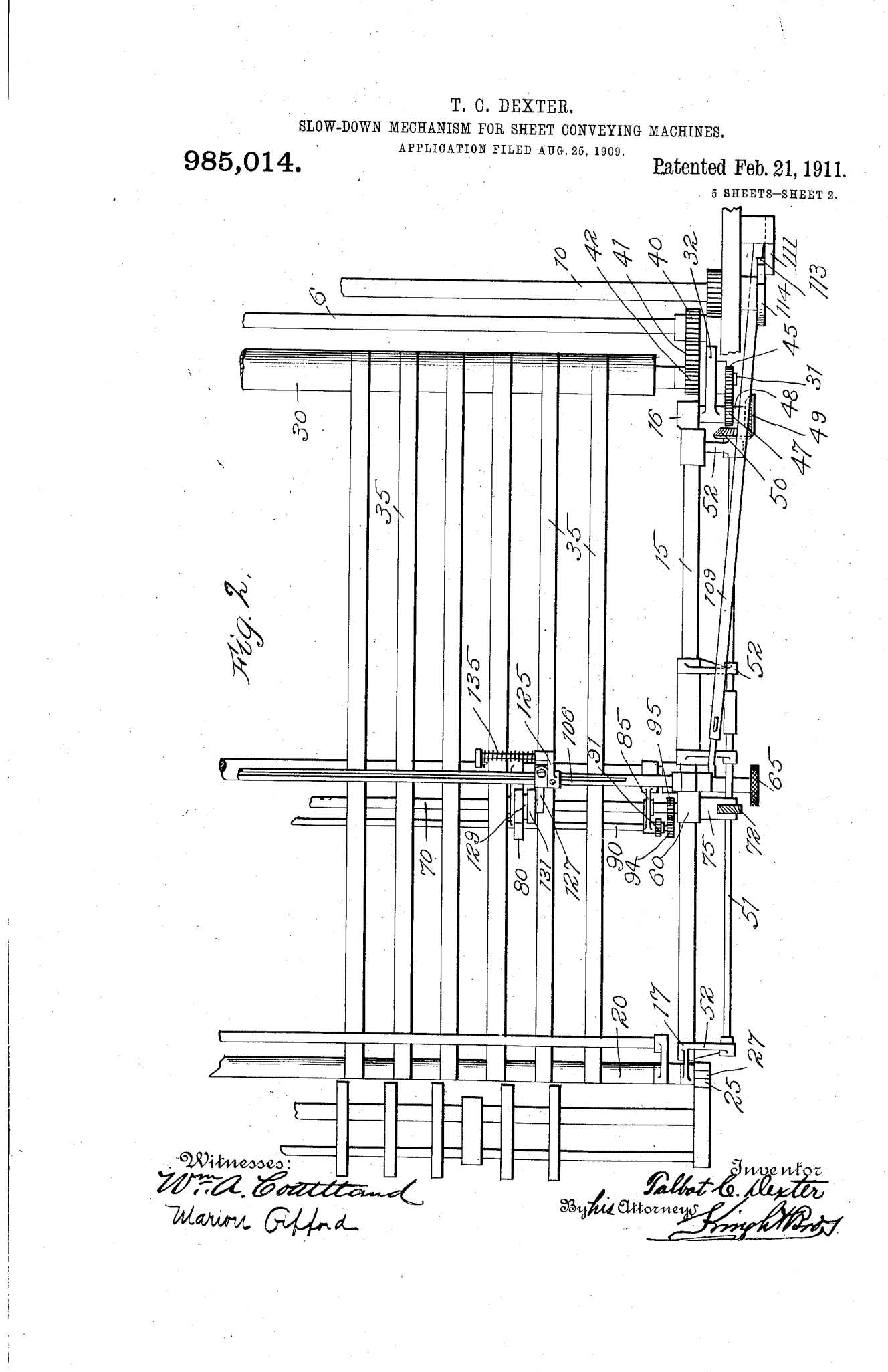

T. C. DEXTER.
SLOW-DOWN MECHANISM FOR SHEET CONVEYING MACHINES.
APPLICATION FILED AUG. 25, 1909.

985,014.

Patented Feb. 21, 1911.

5 SHEETS—SHEET 2.

Fig. 2.

Witnesses:
Wm. A. Courtland
Marion Gifford

Inventor
Talbot C. Dexter
By his Attorneys
Knight Bros.

T. C. DEXTER.
SLOW-DOWN MECHANISM FOR SHEET CONVEYING MACHINES.
APPLICATION FILED AUG. 25, 1909.
985,014.
Patented Feb. 21, 1911.
5 SHEETS—SHEET 3.
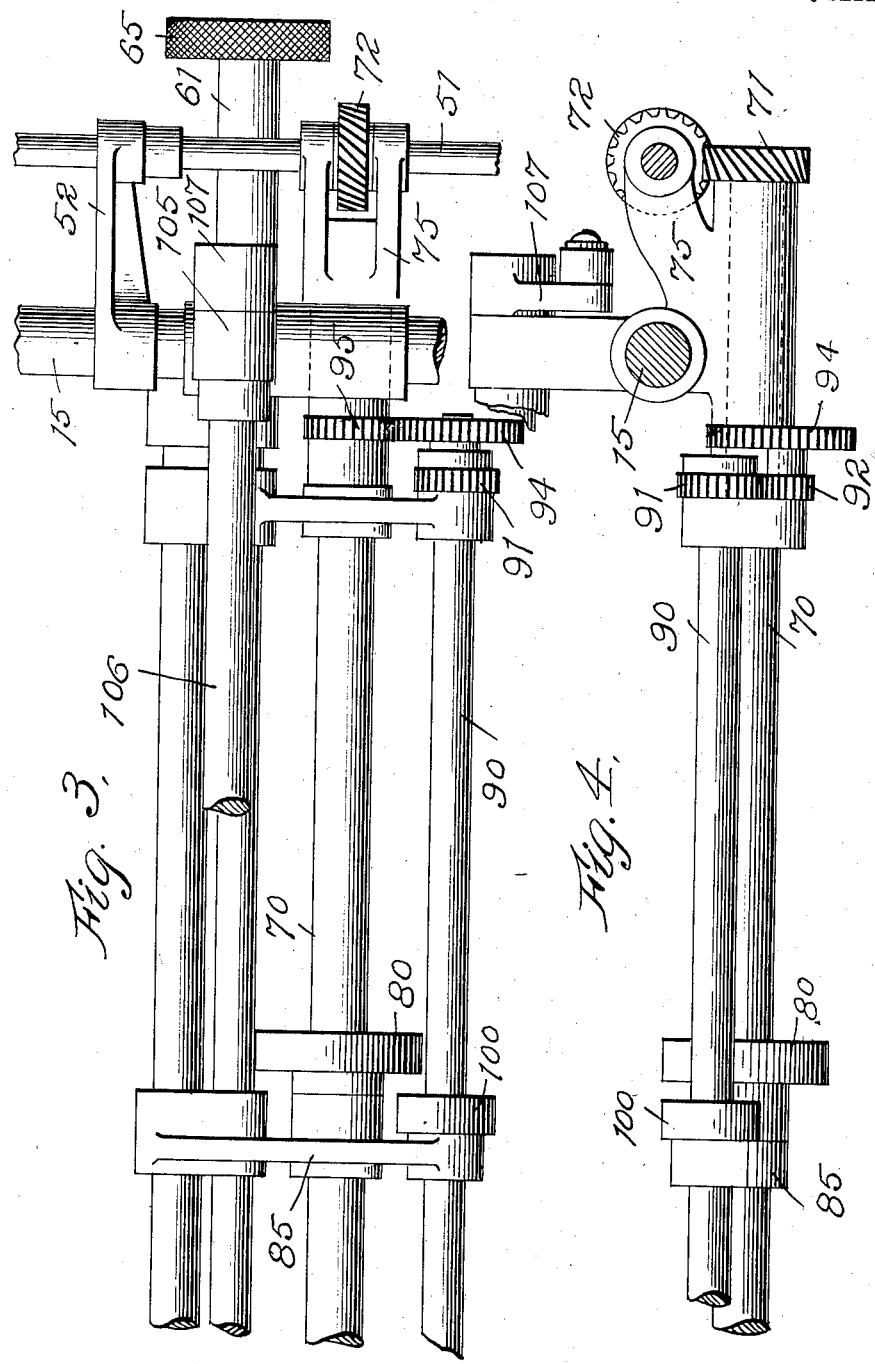

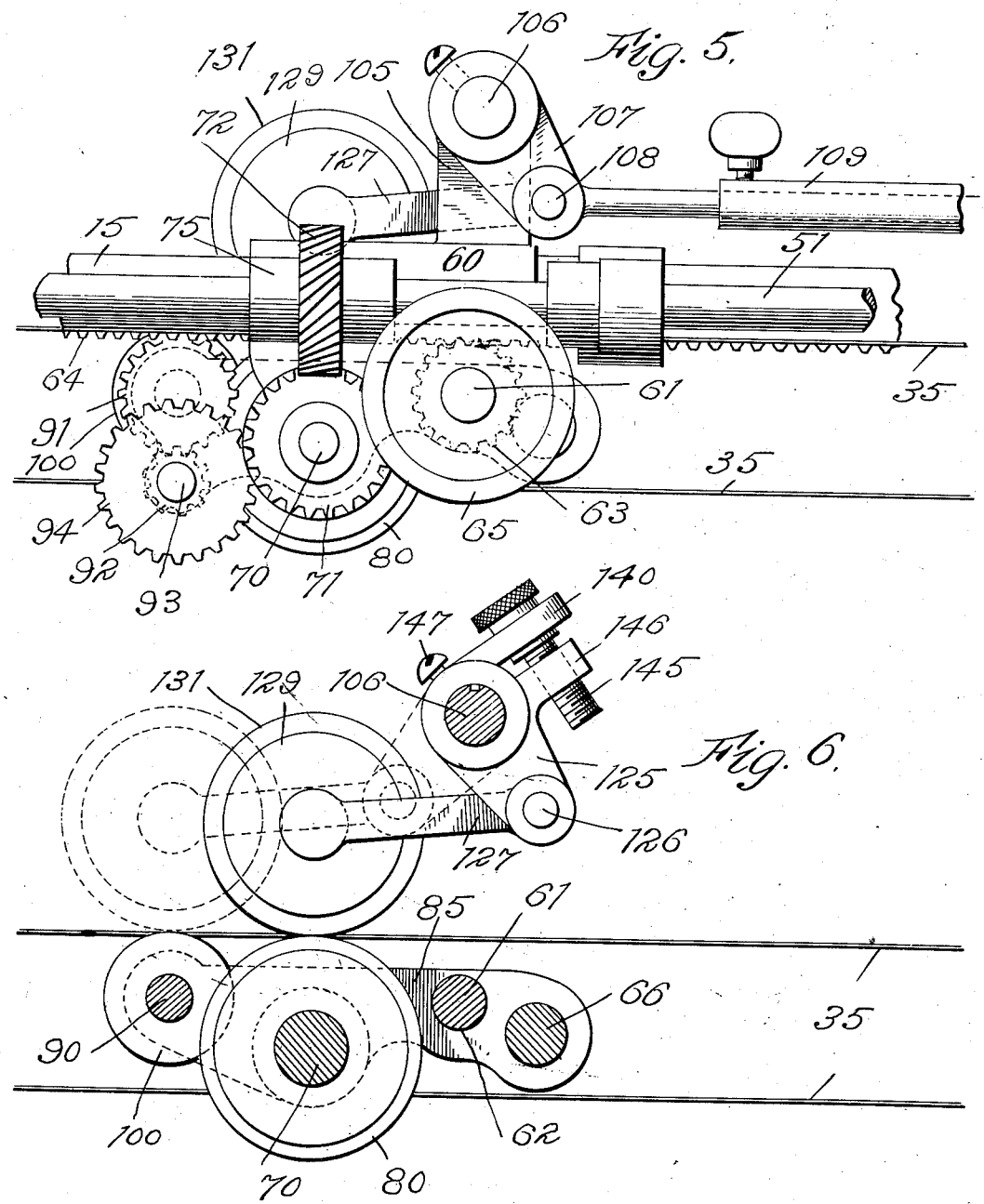

T. C. DEXTER.
SLOW-DOWN MECHANISM FOR SHEET CONVEYING MACHINES.
APPLICATION FILED AUG. 25, 1909.
985,014.
Patented Feb. 21, 1911.
5 SHEETS—SHEET 5.
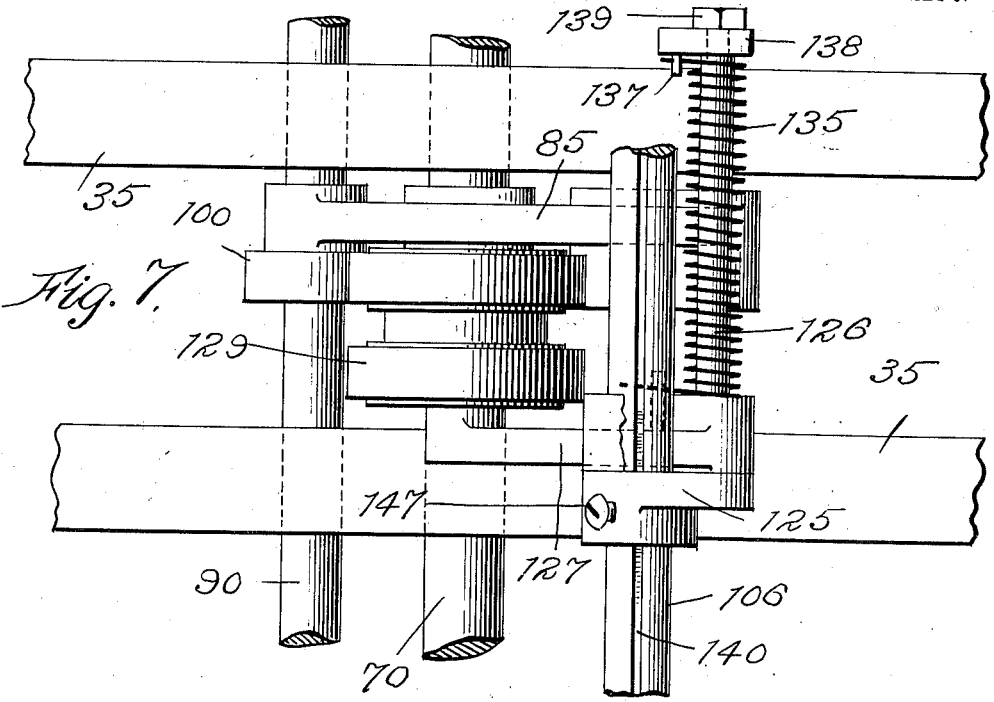
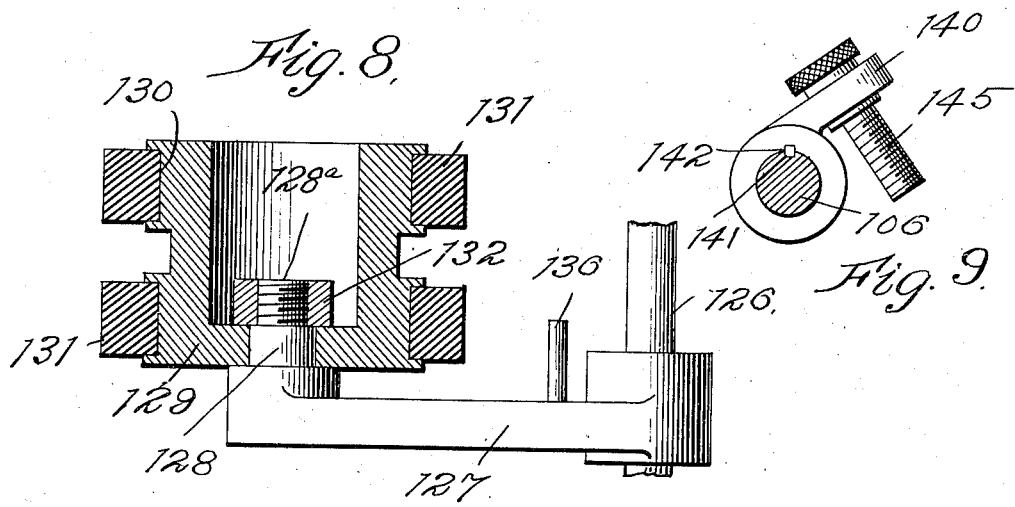

UNITED STATES PATENT OFFICE.

TALBOT C. DEXTER, OF PEARL RIVER, NEW YORK, ASSIGNOR TO DEXTER FOLDER COMPANY, OF PEARL RIVER, NEW YORK, A CORPORATION OF NEW YORK.

SLOW-DOWN MECHANISM FOR SHEET-CONVEYING MACHINES.

985,014.     Specification of Letters Patent.     Patented Feb. 21, 1911.

Application filed August 25, 1909. Serial No. 514,602.

*To all whom it may concern:*

Be it known that I, TALBOT C. DEXTER, a citizen of the United States, residing at Pearl River, in the county of Rockland and State of New York, have invented certain new and useful Improvements in Slow-Down Mechanism for Sheet-Conveying Machines, of which the following is a specification.

My present invention, which is an improvement upon the mechanism covered by Letters Patent No. 764,928 issued to me July 12, 1904, relates to improvements in sheet controlling mechanism for sheet conveyers which are employed for rapidly transferring successive sheets of paper from an automatic paper feeding machine to a printing press, folding machine, ruling machine or other machine designed to operate upon sheets.

The structure covered by my former Patent No. 764,928 comprises a sheet conveyer having a plurality of sheet conveying surfaces traveling at different speeds and arranged to act successively upon a sheet in the order of their decreasing speed, and coöperating rollers having controlling means arranged to cause them to hold a sheet in effective frictional engagement with the conveying surfaces and to transfer the sheet from one conveying surface to the other without releasing the control of the sheet. In the specific embodiment of this former sheet conveying mechanism shown and described in the said patent, I employed two constantly driven feed rollers arranged beneath the plane of feed of the sheets and driving mechanism for causing them to operate at different peripheral speeds, the relatively slow roller being arranged in a slightly lower plane than the high speed roller, and a peculiar form of drop roller mechanism arranged to operate above the differential under rollers so as to hold a passing sheet first in frictional engagement with the high speed roller, and afterward in engagement with the low speed roller to effectively slow down the sheet as it approaches the front gages of the press or other machine to which the sheets are being fed.

In the improved form of slow down sheet conveying mechanism covered by my present case, I have arranged the under differential feeding surfaces in the form of rollers, operating in approximately the same feeding plane and with their peripheries intersecting by reason of their location close together in different vertical planes. The purpose of this arrangement is to remove, as far as possible, the depression or valley between the high and low speed surfaces. Coöperating with this new arrangement of differential rollers, I employ double friction rollers, one portion of each of which is adapted to act upon the sheet above a high speed roller, while the other portion of each of which is adapted to act upon the sheet above the low speed roller. This double form of coöperating rollers is necessitated by reason of the arrangement of the high and low speed rollers in different vertical planes. In the movement of the coöperating rollers from the high speed to the low speed roller, there is a very slight drop necessitated because of the intersection of the peripheries of the under rollers, and on this account the improved slow-down mechanism is capable of operating accurately at very much greater speed than the old form of slow-down mechanism could be operated.

In order that my invention may be fully understood, I will first describe the same with reference to the accompanying drawings, and afterward point out the novelty more particularly in the annexed claims.

In said drawings Figure 1 is a side elevation of a sheet conveying machine having my improvements applied thereto. Fig. 2 is a plan view of the same, only one side of the machine being shown. Fig. 3 is an enlarged detail plan view of parts of the mechanism. Fig. 4 is a vertical transverse sectional view of the parts of the mechanism shown in Fig. 3. Fig. 5 is an enlarged detail side elevation of the improved slow-down mechanism. Fig. 6 is a vertical longitudinal sectional view of the same. Fig. 7 is a plan view of the mechanism shown in Fig. 6. Fig. 8 is a detail sectional view of the double friction roller, and Fig. 9 is a detail view of a part of the adjusting device for regulating the position of the double roller.

In the accompanying drawings, I have shown my improvements applied to a sheet conveying mechanism arranged between an automatic paper feeding machine and a printing press for rapidly conveying the successive sheets separated from the pile of the feeder to the gages of the press.

In Figs. 1 and 2 of the drawings, 1 represents a part of the frame of an ordinary printing press, having the usual impression cylinder, and press gages (not shown) which arrest the successive sheets in position to be taken by the grippers of the impression cylinder. 4 represents a part of the frame of an automatic paper feeding machine. The feeder and press are usually anchored together by stay bars such as 5. 7 represents a pile of sheets in the feeder, 8 the usual front guides for the pile, 6 the under feed shaft of the feeder drop roller delivery mechanism, and 10 the main cam shaft from which all the parts of the feeding machine and sheet conveying mechanism are usually driven.

The conveyer frame proper comprises suitable longitudinal side bars 15 rigidly connected at their ends with corner brackets 16 and 17, said bars being connected and made into a skeleton frame by the usual transverse tie rods and shafts, some of which, forming part of the present invention, will be hereinafter referred to. The conveyer frame is pivotally mounted upon studs projecting inwardly from brackets 32 of the paper feeding machine. The forward end of the conveyer frame is usually made in a detachable section indicated at 26 which is designed to rest upon the press frame 1 as shown. This section 26 of the conveyer frame has formed in its upwardly projecting side brackets the open sockets 25 in which rest studs 27 projecting laterally from the brackets 17 of the main conveyer frame. Journaled in depending lugs of the brackets 17 is the idler tape roller 20 which extends from side to side of the conveyer frame. The forward detachable section 26 of the conveyer frame supports the under guide slats upon which the sheets rest at the front gages of the press. This section of the conveyer frame also usually supports the side registering mechanism which is not herein described.

30 is a tape drum journaled at 31 in the forwardly projecting brackets 32 of the paper feeding machine. This drum 30 drives the endless conveyer tapes 35 which pass around said drum and around the idler roller 20. A series of idler pulleys 36 engage the under lap of the endless conveyer tapes for holding them taut. The shaft 31 of the tape drum 30 carries a gear 42 meshing with an intermediate gear 41 which is driven by a gear 40 keyed to the under feed shaft 6 of the feeding machine above referred to. A gear 45 keyed to the projecting end of the drum shaft 31 meshes with and drives an intermediate gear 46 which in turn meshes with and drives a gear 47 formed integral with the hub 48 of a bevel gear 49 journaled upon a stud of the bracket 32. This bevel gear 49 meshes with and drives a similar bevel gear 50 keyed to the rear end of a sectional driving shaft 51 which extends longitudinally of the conveyer frame at one side thereof and is journaled in the bracket arms 52.

Adjustably mounted upon the side bars 15 of the conveyer frame are the side brackets 60 supporting a number of transverse shafts and tie rods which constitute the carriage of the improved slow-down mechanism. This adjustable carriage is moved longitudinally of the conveyer frame by means of a shaft 61 journaled in the brackets 60 and carrying pinions 63 (shown in dotted lines in Fig. 5) which mesh with the rack bars 64 cut in the under face of the side bars 15. A hand wheel 65 is mounted at each end of the cross shaft 61 for the purpose of rotating said shaft and moving the slow-down carriage into the desired adjusted position longitudinally of the conveyer frame.

The carriage brackets 60 have journaled in them the main transverse shaft 70 which carries at its outer end a spiral gear 71 which meshes with and is driven by a similar spiral gear 72 adjustably splined upon the driving shaft 51 above referred to. This adjustable gear 72 is embraced by the outwardly projecting yoke-shaped bracket 75 of the carriage so as to cause said gear 72 to be adjusted longitudinally upon its driving shaft when the slow-down carriage is adjusted. This main transverse shaft 70 carries between its ends two or more under feed rollers 80 which constitute the high speed rollers of the improved slow-down mechanism. The gearing for driving the shaft 70 is so arranged that the surface speed of the rollers 80 will be the same as the surface speed of the conveyer tapes 35 above referred to. Each of these rollers 80 is arranged between two of the conveyer tapes 35.

Supported upon the adjusting shaft 61, the tie rod 66 and the high speed shaft 70 of the carriage are the longitudinally extending bracket arms 85 in the forward ends of which is journaled the low speed shaft 90 of the slow-down mechanism. This shaft 90 extends from side to side of the conveyer frame and has keyed to one end a small gear wheel 91 which meshes with and is driven by a pinion 92 keyed to a short auxiliary shaft 93 arranged parallel with the shaft 90 and carrying a larger gear wheel 94 which meshes with and is driven by a smaller gear 95 keyed to the high speed shaft 70 above referred to. The auxiliary shaft 93 is journaled in a lug projecting from one of the bracket arms 85. The gearing 91, 92, 94 and 95 serves to reduce the speed of the shaft 90 with relation to the main shaft 70 to obtain the desired slow-down effect. This low speed shaft 90 carries between its ends two or more slow-down rollers 100, each one of which is arranged with its upper surface gages of the press so that each sheet will be freed from the slow-down mechanism when it reaches the gages. The sheets are fed rapidly from the automatic paper feeding machine to the conveyer which carries them forward and delivers them to the front gages of the press. As each sheet passes between the high speed rollers 80 and the coöperating friction rollers 129, it is controlled entirely by said rollers, it being understood that the high speed rollers 80 are traveling at the same peripheral speed as the conveyer tapes 35. The sheet rapidly moves forward through these rollers until the leading edge of the sheet approaches the front gages of the press, when through the action of the controlling cam 114 and rock lever 111, the rock shaft 106 is given a quick forward movement with the result that the friction rollers 129 in engagement with the passing sheet, move away from the high speed rollers 80 into engagement with the low speed rollers 100, and retain their frictional hold upon the sheet during the transfer from high speed rollers to low speed rollers, thereby instantly reducing the speed of the sheet as it reaches the front gages of the press. The rollers 80 and 100 are so arranged that there will be a very slight depression of the sheet as it passes from the control of the high speed rollers to the low speed rollers, which is a very important feature, particularly for rapid work.

What I claim is:

1. In a slow-down mechanism for paper feeding machines, the combination of the high speed rollers and the low speed rollers arranged beneath the plane of feed of sheets in different vertical longitudinal planes, and coöperating friction rollers arranged above the plane of feed of sheets and having frictional treads arranged in the same vertical planes as said high and low speed rollers, with means for intermittently moving said frictional rollers from engagement with the high speed rollers into engagement with the low speed rollers.

2. In a slow-down mechanism for paper feeding machines, the combination of a sheet conveyer, the high speed rollers and the low speed rollers arranged upon said conveyer beneath the plane of feed of sheets in parallel vertical longitudinal planes, and coöperating double friction rollers arranged above the plane of feed of sheets and having parallel frictional treads arranged in the same vertical planes as said high and low speed rollers, with means for intermittently moving said frictional rollers from engagement with the high speed rollers into engagement with the low speed rollers.

3. The combination with a sheet conveyer, of a plurality of sheet conveying rollers arranged in the same feeding plane as the conveyer and in different longitudinal and transverse vertical planes, means for positively rotating said rollers at different peripheral speeds, and means for successively holding a sheet in frictional engagement with the respective conveying rollers and retaining hold of the sheet during its transfer from the control of one conveying roller to another.

4. In a sheet conveyer, the combination of suitable sheet conveying means, feed rollers of different peripheral speeds arranged in the same plane as said conveying means and in different vertical longitudinal planes, means for positively rotating said feed rollers at different peripheral speeds, and friction rollers adapted to successively engage a sheet against said feed rollers.

5. In a sheet conveyer, the combination of suitable sheet conveying means, feed rollers of different peripheral speeds arranged in the path of sheets in different vertical longitudinal planes with their peripheries overlapping, means for positively rotating said feed rollers, and friction rollers adapted to successively engage a sheet against said feed rollers.

6. In a sheet conveyer, the combination of suitable sheet conveying means, feed rollers of different speed relation arranged in the path of sheets adjacent to each other and in parallel vertical longitudinal planes with their peripheries intersecting a common vertical transverse plane, means for positively rotating said feed rollers, and coöperating friction rollers arranged above the plane of feed and adapted to successively engage a sheet with said feed rollers.

7. In a sheet conveyer, the combination of the sheet conveying tapes, parallel feed shafts extending transversely of the conveyer, rollers mounted upon said feed shafts adjacent to each other with their peripheries in the path of sheets and intersecting a common vertical transverse plane, means for driving said feed shafts at different speeds, and coöperating friction rollers adapted to successively hold a sheet in frictional engagement with said feed rollers.

8. In a sheet conveyer, the combination of the feed rollers arranged adjacent to each other in different vertical longitudinal planes beneath the path of sheets, means for driving said feed rollers at different speeds, coöperating friction rollers having frictional treads arranged in the planes of said feed rollers for the purpose set forth, and means for operating said friction rollers for causing them to first engage the high speed feed rollers and afterward engage the low speed feed rollers.

9. In a sheet conveyer, the combination of high and low speed feed rollers operating in approximately the same feeding plane with their peripheries overlapping or intersecting in the same plane as one of the high speed rollers 80. The rollers 100 and 80 are arranged in different vertical planes longitudinally of the conveyer, with their peripheries intersecting when viewed from one side, and the shaft 90 supporting the low speed rollers 100 is journaled as close as possible to the peripheries of high speed rollers 80 so as to reduce to a minimum the depression or valley between the high and low speed rollers.

The carriage brackets 60 support the upright arms or brackets 105 in which is journaled a rock shaft 106 extending from side to side of the machine frame. This rock shaft carries at one end a rock arm 107 pivoted at 108 to an adjustable telescoping rod or pitman 109 which extends rearwardly and is pivotally connected at 110 to a lever 111 pivoted at 112 to the feeder frame 4 and carrying an anti-friction roller 113 which runs in peripheral engagement with a controlling cam 114 mounted upon the feeder cam shaft 10. A suitable spring device indicated at 115 causes the cam roller 113 to follow the shape of the controlling cam 114 with the result that the shaft 106 will be intermittently rocked in its bearings for the purpose which will now be explained.

125 is a rock arm adjustably mounted upon the rock shaft 106 and carrying in its lower end a laterally projecting rigidly secured rod 126. This rod 126 has freely journaled upon it a forwardly projecting arm 127 formed at its end with a laterally projecting bearing stud 128 upon which is journaled a double friction roller 129. This double friction roller 129 is preferably formed as shown particularly in Fig. 8 of the drawings, in which it consists of a cylindrical body portion formed with two external annular grooves 130 in which are seated the rubber rings 131 constituting the friction treads of the wheel. The head of this body portion 129 is journaled upon the stud 128 above referred to and confined thereon by means of a nut 132 engaging the threaded portion 128ª of said stud.

An adjustable tension spring 135 is coiled upon the rod 126 with its inner end in engagement with a pin 136 projecting from the arm 127, and its outer end engaging the pin 137 on a collar 138 adjustably mounted upon the end of rod 126 and confined in the desired adjusted position by a nut 139 threaded upon the reduced end of the rod 126. The spring 135 acting upon the arm 127 holds the friction roller 129 in engagement with the under feed rollers with sufficient tension to maintain control of the sheet and cause it to move at the speed of the particular under roller with which it is held in engagement.

For the purpose of accurately and conveniently adjusting the rock arm 125 around the rock shaft 106, I prefer to mount upon said shaft an arm 140 which is splined upon the shaft by means of a longitudinal groove 141 and spline or key 142 so as to cause said arm to rock with the shaft, but at the same time, be capable of adjustment longitudinally of the shaft or transversely of the conveyer frame. This arm 140 which is arranged alongside of the rock arm 125 above referred to, has journaled in it an adjusting thumb screw 145 which is threaded through an ear or lug 146 formed integral with the rock arm 125. The rock arm 125 is also preferably provided with a set screw 147 which is adapted to engage the shaft 106. Since the arm 14 is held against rotation upon the shaft 106, it will readily be understood that by loosening the set screw 147 of arm 125, the position of arm 125 upon the shaft 106 can be adjusted to a nicety to cause the friction roller 129 to coact properly with the under feed rollers of the slowdown mechanism. When the parts are adjusted to the desired position, they are fixed in this position by means of set screw 147. It will be observed that this adjustment of arm 125 around shaft 106 has the effect of moving the friction rollers forward or backward in the conveyer frame to determine the front and rear limits of their movements. It will also be observed that by reason of the construction just described, this adjustment of the friction rollers 129 longitudinally of the conveyer frame can be effected without interfering with the adjusted tension of spring 135. The adjustment of the friction roller 129 just described is utilized for accomplishing the final positioning of the roller, it being understood that the slowdown carriage is adjustable as a whole upon the conveyer frame in the manner heretofore described.

The rock shaft 106 carries two or more of the double friction rollers 129 mounted as just explained, one of said rollers being arranged directly above each pair of under high speed and slow-down rollers 80 and 100 respectively hereinbefore referred to. The tread portions 131 of the friction roller 129 are spaced apart the same distance that separates the rollers 80 and 100 laterally of the machine so that one of the friction treads 131 will be in the same vertical plane as the high speed roller 80, while the other friction tread 131 will be in the same vertical plane as the low speed roller 100.

The operation of my improved slow-down mechanism for sheet conveyers will be understood from the following explanation: In adjusting the machine to operate upon sheets of a particular size, it will be understood that the slow-down carriage is adjusted upon the conveyer frame to support the slow-down rollers 100 a little more than the length of the sheet away from the front a common transverse plane, means for positively driving said feed rollers, and coöperating double friction rollers, one portion of each of which is adapted to act upon the sheet above a high speed roller, while the other portion of each of which is adapted to act upon the sheet above a low speed roller.

10. In a sheet conveyer, the combination of feed rollers operating at different speeds in approximately the same feeding plane upon parallel transverse axes with their peripheries overlapping, coöperating double friction rollers, each formed with two parallel tread portions, one portion of each of which is adapted to act upon the sheet above a high speed roller, while the other portion of each of which is adapted to act upon the sheet above a low speed roller, and means for shifting the position of said double friction rollers.

TALBOT C. DEXTER.

Witnesses:
A. C. HAMMOND,
E. KETCHUM.